July 21, 1970   U. Z. ESCOLI   3,521,538
FILM MAGAZINE FOR PHOTOTYPOGRAPHICAL MACHINES
Filed June 20, 1967   3 Sheets-Sheet 1

INVENTOR.
URI Z. ESCOLI
BY
ATTORNEY

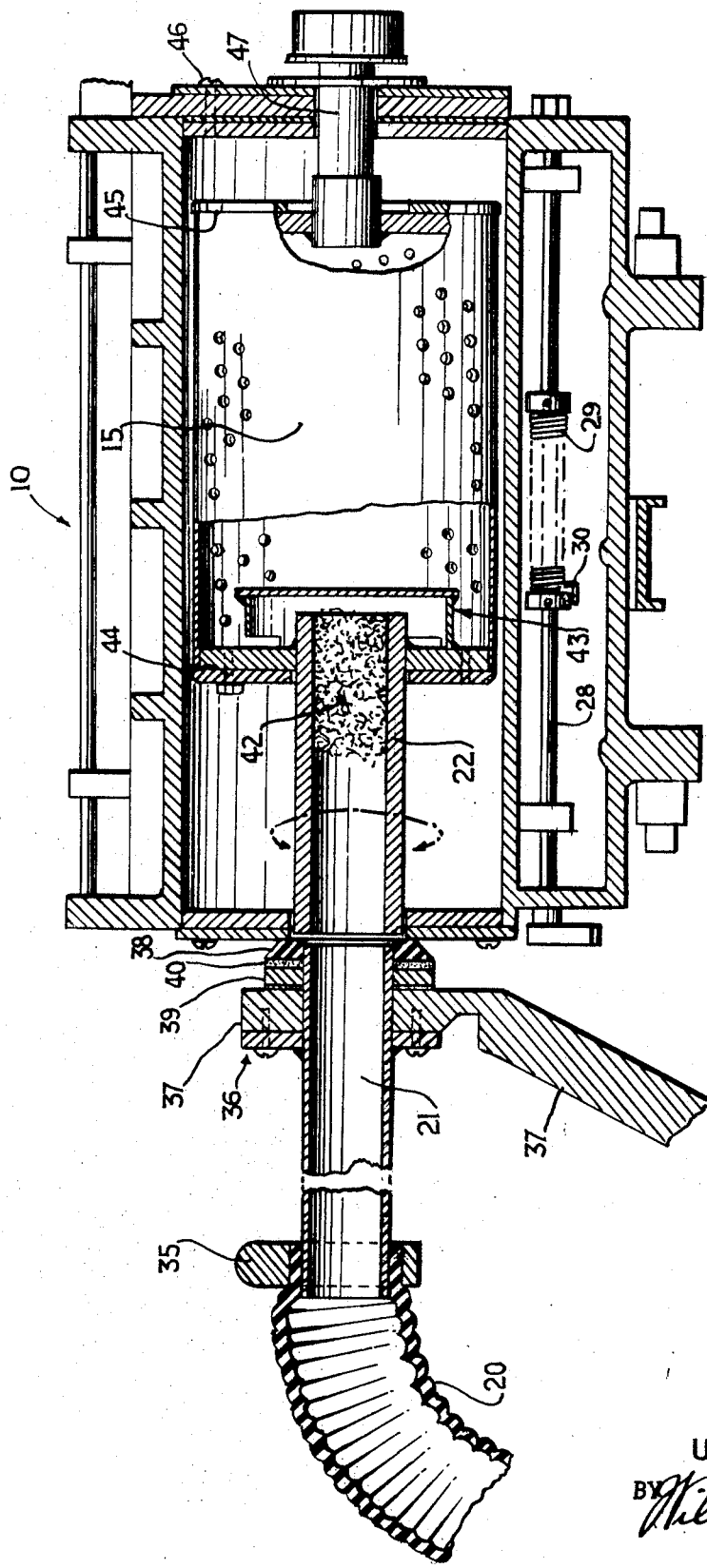

United States Patent Office 3,521,538
Patented July 21, 1970

3,521,538
FILM MAGAZINE FOR PHOTOTYPOGRAPHICAL MACHINES
Uri Z. Escoli, New York, N.Y., assignor to Eltra Corporation, a corporation of New York
Filed June 20, 1967, Ser. No. 647,481
Int. Cl. B41b 21/32
U.S. Cl. 95—4.5                             6 Claims

ABSTRACT OF THE DISCLOSURE

A film magazine comprising a perforated drum over which a sensitized web is trained and to which a vacuum source is connected. The vacuum is continuously applied to the drum so that the web is securely held on the drum both when lines of typographical characters are being photographed thereon and when the drum is stepped to bring an unexposed portion of the web into photographing position.

BACKGROUND OF THE INVENTION

This invention relates to tape-operated photographical machines and particularly to a film magazine for use in such machines.

In these machines, as a coded tape is fed past a reading head, transverse type lines are photographed one after another in spaced relation on a strip of film as the latter is advanced through the magazine in step-by-step fashion. When the film reaches the photographic position, it is necessary that its surface be smooth so that a line can be exposed in proper focus on a uniform surface and also the film must be stationary during exposure of the line. U.S. Pat. 3,078,771 teaches a method of clamping the film in photographic position by vacuum means. A platen is mechanically positioned so as to press the film against the rear face of an apertured plate. A vacuum is then applied to the platen to provide a uniform pressure on the film. This apertured plate is so positioned that the film would be in the focal path of the phototypographical machines optical system. A disadvantage to the use of the platen lay in the fact that, in order to advance the film to the next exposure position, the platen had to be moved away from the film and apertured plate and the vacuum released. The vacuum then had to be reapplied when the platen was returned to its pressing position for exposure of the next line.

The present invention improves upon this method by eliminating the platen and the need for continually releasing and restoring the vacuum. In the present invention, a continuous vacuum is applied to a perforated drum over which the film is wound. This vacuum creates a constant pressure on the film during line composition, and enables the film to be advanced for interline spacing by rotation of the drum.

SUMMARY

The object of the present invention is to provide an improved film magazine for use in phototypographical machines which enables the film to be subjected to a vacuum during film advance for interline spacing as well as during exposure of the film for line composition.

BRIEF DESCRIPTION OF THE DRAWINGS

The foregoing, and other objects, features, and advantages of the invention will be apparent from the following, more particular description of the preferred embodiment of the invention illustrated in the accompanying drawings.

FIG. 3 is an enlarged view similar to FIG. 1 but with the side plates removed showing the entire length of the perforated drum.

Figure 1:
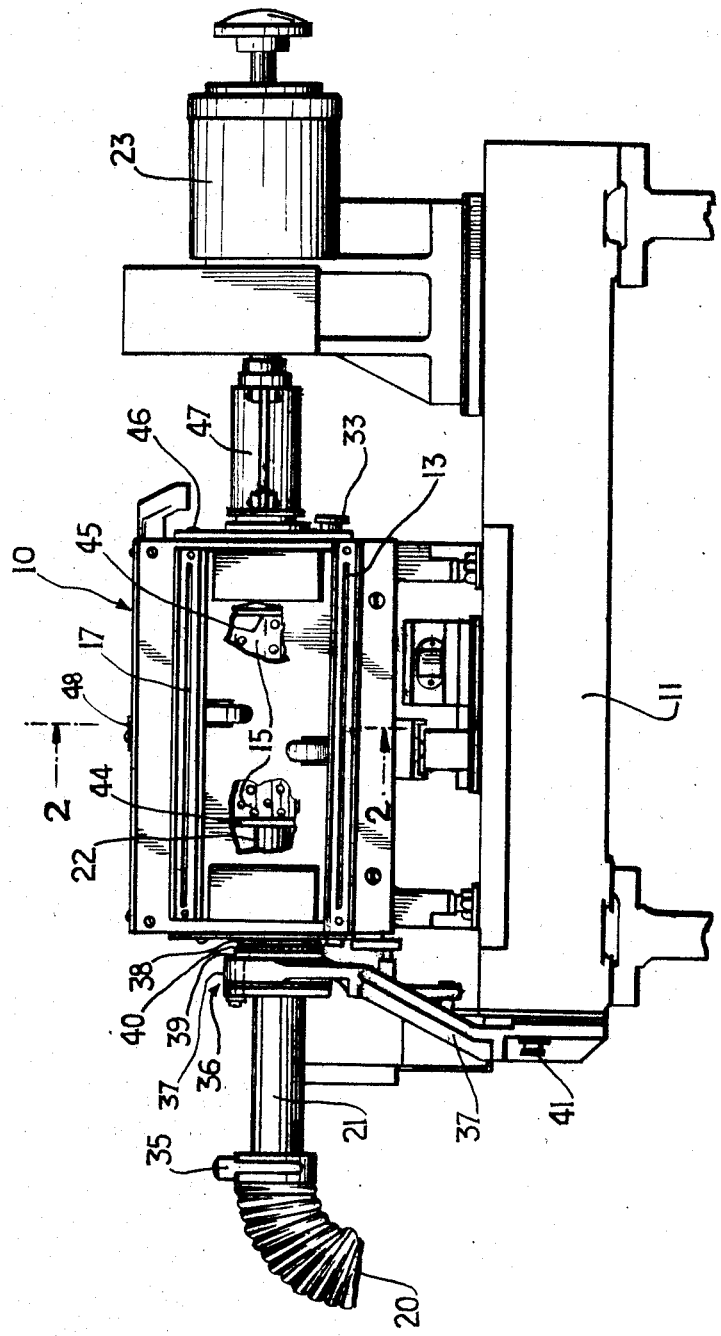
FIG. 1 is a front elevational view of the film magazine in the mounted position with an interior cutout showing the perforated drum within.
Figure 2:
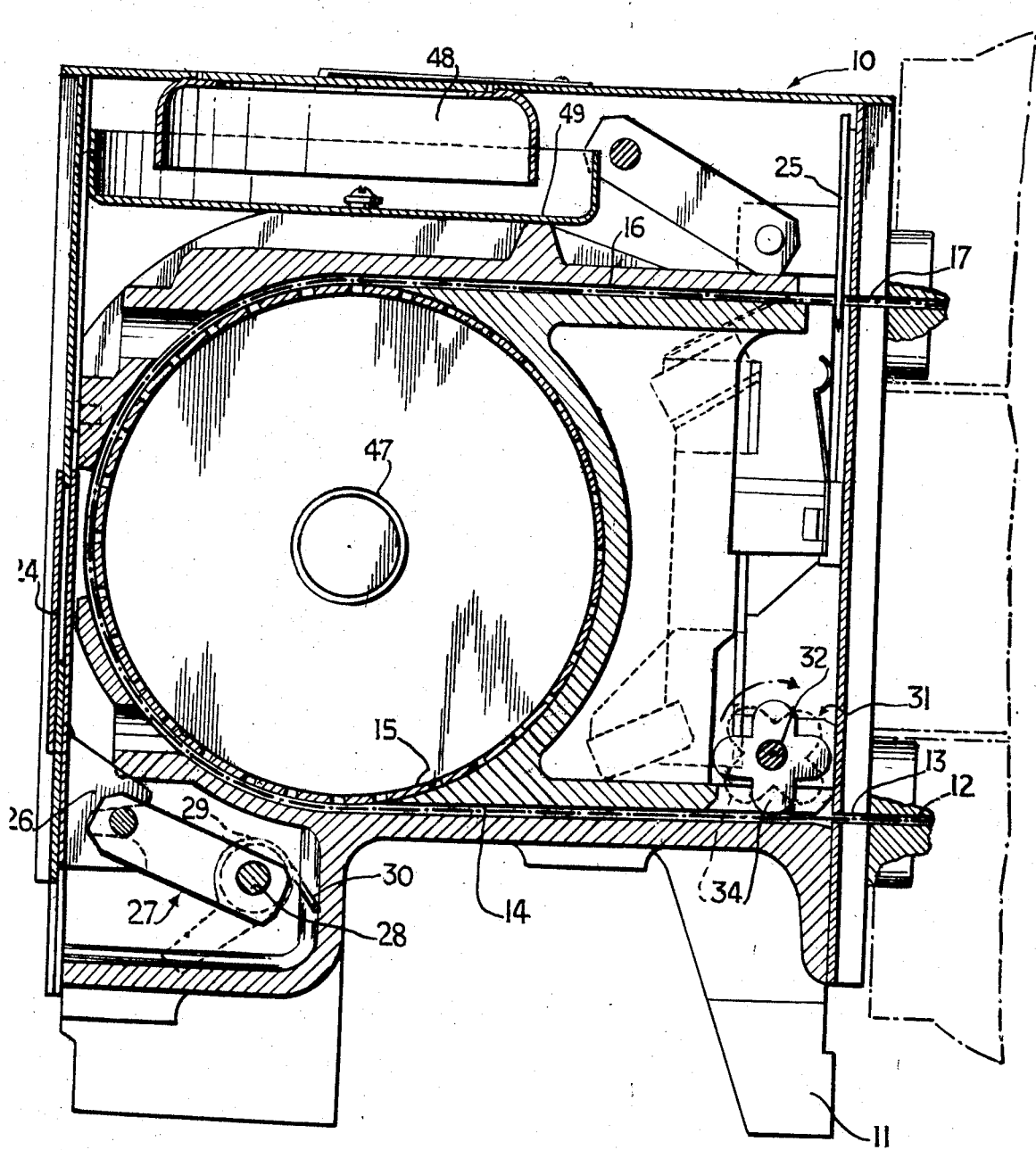
FIG. 2 is an enlarged sectional view taken along line 2—2 of FIG. 1.

Refering to FIGS. 1 and 2, a light-tight film magazine 10 is shown rigidly mounted to a base 11 provided in the phototypographical machine. When so mounted, the magazine abuts that part of the machine where the film supply and film takeup cassettes are mounted. Film 12 is introduced into the magazine through an input slot 13 from a supply cassette (not shown). The film is manually advanced along input film guide channel 14 and around perforated drum 15. The film passes along the output film guide channel 16, finally emerges through output film slot 17 and is wound into a takeup cassette (again not shown). A vacuum pump is connected to drum 15 through vacuum hose 20, hose connection pipe 20 and intake pipe 22 (FIG. 3) thereby physically adhering the film to that portion of the drum over which it is trained. The film is advanced in increments by rotating the drum. This is accomplished by stepping motor 23, the shaft of which is connected to the drum. The vacuum is continuously applied and consequently the film will be advanced accurately since it is never released from vacuum adhesion to the drum. It is, of course, stripped or "peeled" from the drum as it is fed to the takeup spool. The film is exposed through the aperture in the magazine housing formed when light slide 24 (FIG. 2) is lowered. Knife 25 is provided for cutting the film when the desired amount of film has been exposed and wound into the takeup cassette.

The sides of slide 24 form a groove which fits over the edges of the aperture. At the rear bottom corners of the slide are mounted seating members 26. These members seat cranks 27 which are fixedly mounted to shaft 28. The shaft itself extends the width of the magazine and is biased in a counterclockwise direction by spring 29; the bias is halted by the spring mounting pin 30 being brought up against the housing. Slide 24, is shown in FIG. 2 in its normal position completely covering the aperture. The bias on shaft 28 is overcome and the slide forced downward by causing the shaft to rotate counterclockwise (e.g. by solenoid means). Crank 26 rotating with shaft 30 will drive the slide downward. When the solenoid means is deenergized, the shaft is biased clockwise carrying crank and slide upward to the latter's normal position covering the aperture. The control of shaft 30 rotation must be in timed relation with the rotation of drum 15 and the character selection projection circuitry of the phototypographical machine.

The following, more detailed description, will describe the means of applying a vacuum to the perforated drum, the construction of the drum itself, and the co-action of film and drum. Referring to FIG. 2, as film 12 is fed into input feed slot 13, it enters lower film guide channel 14 and passes beneath film feed starwheel member 31. This starwheel member is fixedly mounted on one end of shaft 32 which traverses the width of the film magazine. At the other end of the shaft is film feed control 33 which can be manually rotated clockwise or counterclockwise causing the starwheel member to rotate in a corresponding direction. Member 26 has four equidistant roller projections 34 which frictionally engage the film, each advancing the film a short distance during contact. Upon release of the feed control, member 31 is biased into a non-film engaging position as shown by the dotted portion in FIG. 2. Assuming a clockwise rotation of control 33 (and member 31) the film is made to advance along channel 14, over and around the perimeter of drum 15, and tangentially leaves the drum along upper film guide channel 16. The film emerges from the magazine interior through output film slot 17 and is wound into a take-up cassette.

When the film is properly installed and a machine operational cycle is to begin, a vacuum is applied from an external source through flexible hose 20, hose connection pipe 21, and intake pipe 22 to drum 15.

One end of hose 20 extends over pipe 21 and is clamped in place by clamp 35 to provide an airtight connection. Pipe 21 is fixed horizontally and held tightly against the surface of housing 10 by support assembly 36. This assembly (FIGS. 1 and 3) consists of a bracket 37, and a rubber buffer 38, and block buffer 39 connected by adhesive 40. The lower end of the bracket is rigidly affixed to base 11 by four screws 41. The upper end of the bracket, to which are affixed the adhesive-connected buffers, is drilled through with a shaft whose diameter snugly accommodates pipe 21. When assembly 36 is properly mounted, rubber buffer 38 is held air-tight to the face of housing 10. One end of intake pipe 22 is fixedly mounted to drum 15 (by welding in this embodiment) and projects a short distance into the drum's interior. The pipe essentially becomes an extension of the drum and will rotate with it during film advance operation. The other end of the intake pipe terminates flush with the outside face of the housing and thus supports the drum for rotation in the housing. A hole has been cut into the housing at this point with a diameter just wide enough to accommodate rotation of pipe 22. Steel wool 42 has been placed into the drum end of the pipe to block light which might enter the housing interior and fog the film. Any material having similar qualities of porousness and opequeness may be used. Despite the fact that pipe 22 rotates relative to pipe 21 and buffer 38, the construction just described has been found sufficiently air-tight so that the required degree of vacuum within drum 15 is maintained.

Drum 15 is a seamless tube in this embodiment but its construction need not be limited to that form. The drum's essential characteristic is a perfectly smooth exterior surface punctuated randomly but in degree sufficient to cause a film laid thereon to be acted upon uniformly by a vacuum applied to the drum's interior. Light baffle 43 (FIG. 2) is mounted inside the drum directly in front of the end of pipe 22 and, in conjunction with the aforementioned steel wool, blocks all but a negligible amount of light from entering the cavity through that source. Two raised guides 44 and 45 extend around the drum perimeter at each end and provide the bounds for the film.

The drum shown in the embodiment of FIG. 2 will accommodate a six-inch wide film; however, drums of different lengths may be substituted to accommodate films of other widths. A drum can be removed from the housing by merely removing screws 46 and detaching coupling 47. The replacement drum will, of course, have the appropriate longer or shorter length of intake pipe 22 attached to the vacuum end. An air inlet to the magazine is provided through a baffle 48 and it is the difference in air pressure between this outside air and the vacuum inside the drum which keeps the film in contact with the drum. A filter unit 49 screens out impurities from the incoming air.

Thus, with a vacuum being continuously applied to the drum, a constant pressure is applied to the film wound about the drum causing the film to be kept in an immobile and wrinkle-free condition even when being advanced.

The film is advanced by action of stepping motor 23 (FIG. 1) whose shaft drives drum 15 through coupling member 47. The amount of drum rotation and hence, the amount of film advance, is controlled by the action of the stepping motor. At the end of a line of composition the stepping motor is actuated to advance the drum, and the film, the desired distance.

Having thus described the invention it is to be understood that many changes and apparently different embodiments could be made thereto without departing from its spirit or scope. Accordingly, the description and drawings of the preferred embodiment disclosed are to be interpreted in an illustrative rather than a limiting sense.

What is claimed is:

1. A film magazine for a phototypographical machine wherein a sensitized web is advanced through the magazine in step by step fashion from a supply roll to a take-up cassette and upon which lines of typographical characters are photographed while the web is stationary, said magazine comprising a hollow platen drum over which the sensitized web is trained when transported to the take-up cassette, said platen drum being provided with a plurality of apertures leading from the exterior surface of the drum to its interior, motor means for rotating said drum in step by step fashion to bring unexposed portions of the sensitized web into line photographing position, a vacuum source, and means for connecting said vacuum source to the interior of said platen drum, said connecting means including a relatively air tight fitting between the stationary vacuum source and the rotatable drum, the arrangement being such that the vacuum is applied continuously to the platen drum when it is stationary during photography of a line of typographical characters and when it is being rotated to bring an unexposed portion of the sensitized web into photographing position.

2. A film magazine according to claim 1 including means substantially covering that portion of the drum not overlaid by the film at any instant whereby the vacuum applied to the drum is effective to secure the film to the drum.

3. A film magazine according to claim 1 including a housing within which the perforated drum rotates, and wherein said vacuum means includes an intake pipe means connected to and rotatable with the perforated drum, said pipe means extending from the interior of the drum to the outside of said housing, a fixedly mounted vacuum member mounted outside said housing but in substantially air-tight abutment with said pipe means, and a vacuum pump means connected to said vacuum member.

4. A film magazine according to claim 3 wherein the perforated drum and the intake pipe means are removably mounted as a unit in the housing whereby a different length drum and intake pipe means may be substituted to accommodate a different width film.

5. A film magazine according to claim 3 including a baffle member mounted inside said perforated drum opposite the mouth of said intake pipe means so as to block any incident light from entering the drum.

6. A film magazine according to claim 1 wherein said rotating means is a stepping motor.

References Cited

UNITED STATES PATENTS

| | | | |
|---|---|---|---|
| 601,883 | 4/1898 | Schwarz | 355—91 |
| 2,797,626 | 7/1957 | Tondreau | 355—91 |
| 2,985,081 | 5/1961 | Jacomelli | 95—4.5 |
| 3,142,240 | 7/1964 | Brownscombe | 355—73 |
| 3,165,047 | 7/1965 | Hersh | 355—110 |
| 3,229,953 | 1/1966 | Muir | 355—73 |

JOHN M. HORAN, Primary Examiner

L. H. McCORMICK, Jr., Assistant Examiner

U.S. Cl. X.R.

355—73, 91